March 25, 1969     J. T. POTTER     3,434,218

COORDINATE MEASURING MACHINE

Filed Nov. 25, 1966

INVENTOR
JOHN T. POTTER
BY
Lawrence J. Marhoefer
ATTORNEY

United States Patent Office 3,434,218
Patented Mar. 25, 1969

3,434,218
COORDINATE MEASURING MACHINE
John T. Potter, Plainview, N.Y., assignor to Potter Instrument Company, Inc., Plainview, N.Y., a corporation of New York
Filed Nov. 25, 1966, Ser. No. 596,843
Int. Cl. G01b 5/14
U.S. Cl. 33—189                        2 Claims

ABSTRACT OF THE DISCLOSURE

The specification and drawings disclose a probe mount for a coordinate measuring machine which allows the probe to be mounted on both sides of the cross beam which carries the mount. Probes mounted on both sides of the beam operate in conjunction with a switch that permits the probes to be moved without changing the indicated measured distance to any point in order to measure from one extreme position of the measuring machine bed to the other.

---

Figure 1:
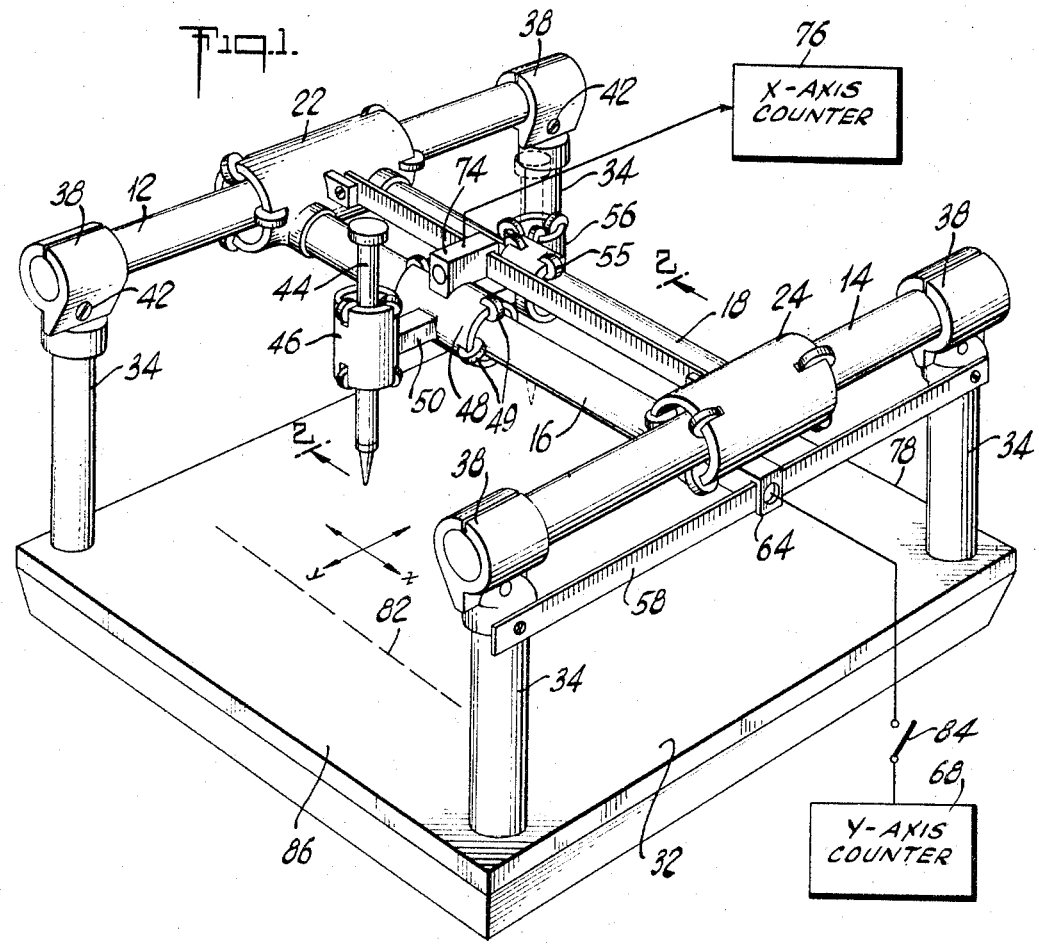

This invention relates to a coordinate measuring machine in which the coordinates of a point are determined by means of a movable probe, and more particularly, to an improved probe mounting arrangement which extends the operational area of the machine.

In certain coordinate measuring machines, a movable probe depends from a cross member which is mounted between two parallel ways that extend along either side of the machine bed. The coordinates of one or more points on a workpiece positioned on the bed can be determined by moving the probe to the point or points and measuring the distance traveled.

The cross member is secured to carriages which move along the ways on bearings. The cross member and carriages necessarily extend an appreciable distance along the ways in order to satisfactorily support the probe and permit it to be moved accurately over the machine bed; a factor which materially diminished the area that can be covered by the probe in prior art machines. For example, with the probe mounted in front of the cross member, there is a region along the rear edge of the bed which it can not reach.

One object of this invention is the provision of an improved probe mounting arrangement which extends the operational area of a coordinate measuring machine of the type described.

Another object of this invention is to provide an improved probe mounting arrangement to extend the operational area of the machine without materially increasing its cost.

Briefly, this invention contemplates the provision of a probe mounting arrangement which permits the probe to be mounted in two positions. In one position, the probe is mounted in back of the cross member, allowing it to cover an area extending from the rear edge of the machine bed forward to some intermediate point; in the other position, it is mounted in front of the cross member, allowing it to cover an area extending from the intermediate point to the front edge of the bed.

Figure 2:
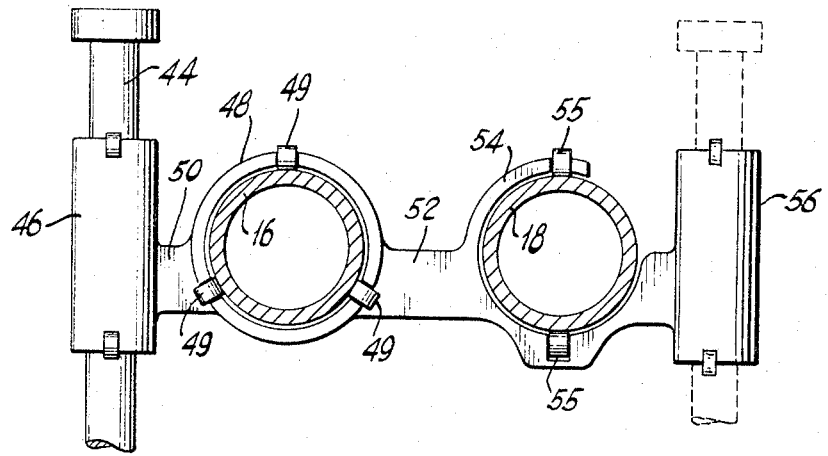

Having briefly described this invention, it will be described in greater detail along with other objects and advantages in the following detailed description of a preferred embodiment which may be best understood by reference in the accompanying drawings which form part of the instant specification and which are to be read in conjunction therewith and which like reference numerals are used to indicate like parts in the various views;

FIGURE 1 is a perspective view of a coordinate measuring machine showing one embodiment of the novel probe mounting arrangement of the invention; and FIGURE 2 is a sectional view along the line 2—2 of FIGURE 1 with certain parts omitted for clarity.

Referring now to FIGURE 1, two parallel hollow cylindrical beams 12 and 14 acts as ways between which cross members 16 and 18 are mounted by means of carriages 22 and 24. Members 16 and 18 are preferably hollow cylindrical beams similar to beams 12 and 14 and are secured to the carriages 22 and 24 at their respective opposite ends in a manner that they are both parallel to a planar machine bed 32.

The ends of beams 12 and 14 are secured in respective split sleeve clamps 38 which are secured by pins 42 atop stanchions 34. The stanchions 34 are secured to the bed 32 at each of its four corners.

Referring now to FIGURE 2 in addition to FIGURE 1, a probe mount of this invention has a vertically disposed sleeve 46 mounted in front of cross members 16 and 18 and a similar vertically disposed sleeve 56 mounted in back of the cross members. A single probe 44 may be used and moved from one sleeve to the other, or alternatively, two probes may be employed, if desired. Arms 50 and 52 cantilever sleeves 46 and 56 respectively form a carriage 48 mounted by rotatably mounted discs 49 on cross member 16.

The arm 52 has an arcuate projection 54 which partially encircles member 18; rotatably mounted discs 55 carried by the arm 52 and its projection 54 contact member 18, stabilizing carriage 48.

The position of a probe 44 with respect to the machine axes (designated as X and Y) may be determined in any suitable manner known in the art. In the specific embodiment of the invention shown, a metrological grating system is employed, with metrological gratings 58 and 72 mounted along the X and Y axes, respectively. A Y axis transducer 64 secured to the carriage 24 moves along the grating 58 as the carriage moves, and an X axis transducer 74 secured to the carriage 48 moves along grating 72 as the carriage 48 moves. The transducers 64 and 74 are conventional and well known in the art, each comprising a light source, a small metrological grating, and a photo-sensitive cell. The output of the photo-sensitive cell is a series of pulses; each pulse indicates that the probe has moved a predetermined incremental distance.

The output of transducer 74 is coupled to an X axis counter 76 in a suitable manner known in the art; the count accumulated by this counter is a function of the position of sleeves 46 and 56 along the X axis. The output of transducer 64 is coupled to a Y axis counter 68 via a switch, indicated schematically at 84, which, in the open position, permits the cross members 16 and 18 to be moved in a Y axis direction without changing the count in the counter. Of course any suitable circuit known in the art may be used for disabling the counter, if desired.

In operation, with a probe 44 mounted in the rear sleeve 56, an area can be covered which extends from the near rear edge 78 of the bed 32 to some feature or point on a workpiece in the region of the dotted line 82, for example. The count accumulated by counters 76 and 68 indicate, respectively, the X and Y coordinates of the probe position with respect to a reference point. It will be appreciated that a reference point may be chosen arbitrarily and established by positioning the probe at the desired point and setting the count in counters 68 and 76 to a predetermined count such as zero (0) in a suitable manner known in the art (not shown).

In order to measure features on the workpiece in the region from line 82 forward to the front edge of the machine, the switch 84 is opened in order to disenable counter 68. The probe is removed from the rear sleeve 56 and inserted in the front sleeve 46. Of course, two probes may be used if desired, making it unnecessary to remove the probe. The probe in the front sleeve 46 is moved back to the point or feature on the workpiece at which the switch 84 was opened. The count registered by counter 68 does not change. When the probe is thusly repositioned, switch 84 is closed and the probe 44 can be moved over the forward area of the bed 32, almost to its front edge 86.

Thus, it will be seen that the objects of the invention have been accomplished. The novel probe mount of this invention increases the area which can be covered by the probe at very little added expense for the overall machine.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed:

1. In a coordinate measuring machine, the combination comprising:
   a cross member including two cylindrical, co-planar beams,
   two parallel ways,
   means for mounting said cross member between said ways,
   means for mounting a probe on both sides of said cross member, said mounting means including a carriage which rides on one of said beams, a guide which rides on the other of said beams, a vertical sleeve cantilevered from said carriage on one side of said one beam, and a vertical sleeve cantilevered from said carriage on the opposite side of said other beam,
   first means including a first encoder for indicating the position of said mounting means along said cross member,
   second means including a second encoder for indicating a position of said mounting means along said ways, and
   a third means for allowing movement of said mounting means with respect to said ways without changing the indication of said second means.

2. In a coordinate measuring machine, the combination comprising:
   a machine bed,
   a beam,
   means for mounting said beam for movement over said bed,
   means for mounting a probe for movement along said beam including a carriage which rides along said beam, a pair of sleeves, and means for cantilevering said sleeves from said carriage on opposite sides of said beam respectively,
   a transducer responsive to the movement of said beam,
   a counter responsive to the output of said transducer, and
   means for disabling said counter.

References Cited

UNITED STATES PATENTS

| | | |
|---|---|---|
| 2,981,123 | 4/1961 | McHugh. |
| 3,001,081 | 9/1961 | Bower. |
| 3,059,337 | 10/1962 | Lynch _____ 33—189 X |
| 3,212,194 | 10/1965 | Brault _____ 33—189 |
| 3,345,747 | 10/1967 | Sattler. |
| 1,713,025 | 5/1929 | Castleman _____ 33—11 X |

FOREIGN PATENTS

| | | |
|---|---|---|
| 343,751 | 2/1960 | Switzerland. |

WILLIAM D. MARTIN, Jr., *Primary Examiner.*

U.S. Cl. X.R.

33—1, 125